United States Patent
Mueller et al.

(10) Patent No.: US 10,308,220 B2
(45) Date of Patent: Jun. 4, 2019

(54) METHOD AND APPARATUS TO SECURE A SYSTEM FOR PASSIVE UNLOCKING OF A VEHICLE SYSTEM AGAINST RELAY STATION ATTACKS

(71) Applicant: FORD GLOBAL TECHNOLOGIES, LLC, Dearborn, MI (US)

(72) Inventors: Holger Mueller, Cologne (DE); Andreas Springer, Cologne (DE); Uwe Zank, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/852,064

(22) Filed: Dec. 22, 2017

(65) Prior Publication Data

US 2018/0194322 A1 Jul. 12, 2018

(30) Foreign Application Priority Data

Jan. 11, 2017 (DE) ......................... 10 2017 200 378

(51) Int. Cl.
*B60R 25/24* (2013.01)
*G07C 9/00* (2006.01)

(52) U.S. Cl.
CPC ............... *B60R 25/24* (2013.01); *G07C 9/00* (2013.01); *G07C 9/00309* (2013.01); *G07C 2009/00555* (2013.01)

(58) Field of Classification Search
CPC ...... G07C 9/00309; G07C 2009/00555; G07C 2009/00198; G07C 2009/00293; G07C 2209/61; G07C 9/00658; B60R 25/24; B60R 25/246; B60R 25/00; H04W 12/06; H04W 12/08; H04W 12/12; H04L 9/3271;
(Continued)

(56) References Cited

U.S. PATENT DOCUMENTS 8,195,422 B2 * 6/2012 Wilcox ............... A61K 31/365
342/118
8,976,005 B2 3/2015 Zivkovic et al.
(Continued)

FOREIGN PATENT DOCUMENTS

DE 4440855 A1 5/1996
DE 102009014975 A1 9/2010
(Continued)

*Primary Examiner* — Brian E Miller
(74) *Attorney, Agent, or Firm* — Frank Lollo; Brooks Kushman P.C.

(57) ABSTRACT

The disclosure relates to a method and an apparatus to secure a system for passive unlocking of a vehicle system, particularly a vehicle unlocking system, against relay station attacks. The system comprises a vehicle-based device that can send on a first radio frequency and receive on a second radio frequency, and a driver-based device that can receive on the first radio frequency and send on the second radio frequency. The vehicle-based device and/or the driver-based device are also able to receive on a radio frequency that the other device can receive. One of the two devices send at least one ambient noise signal sequence to the other device. The ambient noise signal sequences received by both are compared with one another with cross-correlation. A current situation is deemed safe if the cross-correlation is strong and a phase shift is small.

12 Claims, 2 Drawing Sheets

(58) Field of Classification Search
CPC ............ H04L 2209/80; H04L 2209/84; H04L 63/1466
See application file for complete search history.

(56) References Cited

U.S. PATENT DOCUMENTS

| | | | |
|---|---|---|---|
| 9,875,589 B1* | 1/2018 | Buttolo | G08G 1/202 |
| 2006/0255909 A1 | 11/2006 | Pavatith et al. | |
| 2010/0321154 A1 | 12/2010 | Ghabra et al. | |
| 2013/0078906 A1 | 3/2013 | Ben Hamida et al. | |
| 2014/0067161 A1 | 3/2014 | Conner et al. | |
| 2014/0240088 A1 | 8/2014 | Robinette et al. | |
| 2016/0200291 A1 | 7/2016 | Kim et al. | |
| 2016/0234684 A1* | 8/2016 | Hekstra | H04K 1/02 |
| 2016/0302074 A1* | 10/2016 | Hekstra | H04L 9/00 |
| 2016/0323246 A1* | 11/2016 | Zivkovic | H04W 12/06 |
| 2018/0194322 A1* | 7/2018 | Mueller | G07C 9/00 |
| 2018/0254870 A1* | 9/2018 | Dutz | H04L 5/0051 |
| 2018/0254910 A1* | 9/2018 | Dutz | H04L 9/3271 |
| 2018/0254923 A1* | 9/2018 | Dutz | H04L 25/0202 |

FOREIGN PATENT DOCUMENTS

| | | |
|---|---|---|
| EP | 1690758 A1 | 8/2006 |
| WO | 2015026001 A1 | 2/2015 |

* cited by examiner

METHOD AND APPARATUS TO SECURE A SYSTEM FOR PASSIVE UNLOCKING OF A VEHICLE SYSTEM AGAINST RELAY STATION ATTACKS

CROSS-REFERENCE TO RELATED APPLICATIONS

This application claims foreign priority benefits under 35 U.S.C. § 119(a)-(d) to DE Application 10 2017 200 378.2 filed Jan. 11, 2017, which is hereby incorporated by reference in its entirety.

TECHNICAL FIELD

The disclosure relates to a method to secure a system for passive unlocking of a vehicle system, particularly a vehicle unlocking system, against a relay station attack.

BACKGROUND

A keyless entry system is a system to unlock a vehicle without actively using a car key, and to start a vehicle by merely operating the starter button, namely using a radio key that the vehicle driver carries. If only passive vehicle unlocking is possible, this is referred to as keyless entry.

When the user approaches the vehicle or e.g. touches the door handle of the vehicle, the device installed in the vehicle is woken and sends, to the radio key, a radio signal at a first frequency, preferably (but not necessarily) more likely at a low frequency of typically <300 kHz, which radio signal includes an encoded enquiry signal. The radio key decodes the enquiry signal, provides it with a new coding and transmits it again as a response signal on a second, preferably higher, frequency, for example one in the UHF band, as illustrated in FIG. 1. The device installed in the vehicle knows the coding scheme of the radio key, and if the response signal matches the response signal to be expected then the vehicle is unlocked.

A range of the radio signal at the first, preferably lower, frequency is restricted to a few meters, for the most part approximately 3 meters, so that only a radio key situated close to the vehicle can be woken or activated by the vehicle-based device.

A relay station attack (RSA) primarily extends the range of the radio signal at the preferably lower frequency using two relay stations, a first in proximity to the vehicle door and a second in proximity to the person who carries the radio key, as described below with reference to FIG. 2.

An attacker who carries the first relay station wakes the vehicle-based device, e.g. by touching the door handle, so that it sends the radio signal at the first frequency. This radio signal is received by the first relay station and sent thereby on the second (normally, but not necessarily, much higher) frequency to the second relay station, which converts it back into the original radio signal of the first frequency and sends it to the radio key.

The response signal of the radio key is normally strong enough to span the distance back to the vehicle, and opens the vehicle (what is known as the minor variant of the RSA). If the response signal of the radio key is not strong enough, the relay stations can provide a return channel that extends the range of the radio signal at the higher frequency (what is known as the major variant of the RSA).

DE 103 01 146 A1 discloses a method to secure a system for passive vehicle unlocking against relay station attacks. The vehicle-based device regularly monitors the natural RF signal level received by it and identifies a relay station from interference in the natural RF signal level, which interference is identified by a noise test.

US 2016/0200291 A1 discloses a method to secure a system for passive vehicle unlocking against relay station attacks insofar as a low-frequency unidirectional and a high-frequency bidirectional radio link are provided. It is thus possible for noise signals to be identified that any relay stations have added to the radio signals.

US 2013/0078906 A1 describes a method to secure a radio link between a transmitter and a receiver, also for remote-controlled opening of a vehicle, against relay station attacks, the intervention of relay stations being identified on the basis of the effect thereof on the noise in the signal received by the receiver. To this end, characteristic noise parameters are extracted and compared with a reference noise signal.

The known methods for preventing relay station attacks are not invulnerable, and therefore the disclosure is based on the object of specifying a more reliable method to secure a system for passive vehicle unlocking against relay station attacks.

SUMMARY

This object is achieved by a method and an apparatus to secure a system for passive vehicle unlocking against relay station attacks.

According to the disclosure, two devices each receive an ambient noise signal on a radio frequency on which they both receive. One of the two devices sends the ambient noise signal received by it to the other device, where the ambient noise signal is compared with the ambient noise signal received here. A current situation is deemed safe if the ambient noise signals received by both match in terms of prescribed features, because in this case a distance between a vehicle and a radio key is actually small, and a current relay station attack is pointless or barely possible, and the vehicle is unlocked.

The disclosure is based on there being sufficient, multi-frequency, ambient noise from radio waves practically everywhere, which ambient noise for the most part comes from a multiplicity of technical sources, but may also have natural causes.

In a frequency band in which the vehicle-based device and the radio key both have appropriate receivers, this ambient noise can be received by both devices, and one of the devices, preferably the radio key, can send the ambient noise received to the other device, preferably to a vehicle-based device, where the ambient noise is compared with the ambient noise received here.

The transmission of the ambient noise signal can either comprise transmission of a complete ambient noise signal sequence, or, to shorten the transmission times or the data volumes, it is possible for just one or more characteristic features of the ambient noise signal, e.g. particular amplitudes at particular sample times etc., to be transmitted.

To shorten the communication times, it is further conceivable for the ambient noise signals to be "preventively" captured both by transmitter and by receiver continually or at particular intervals of time before the actual key activation, and for it to be possible to resort to the already collected ambient signal patterns in a matching time period when the key signal is present.

In a preferred embodiment of the disclosure, ambient noise signal sequences received at different locations are compared with one another using cross-correlation, which describes the correlation between two time-shifted signals. An unlock command from the radio key is complied with by the vehicle only if the cross-correlation is both strong, and thus exhibits a high level of similarity between the two ambient noise signal sequences, and exhibits only a small phase shift, which indicates that the radio key is close to the vehicle and the current situation is clearly safe.

On the other hand, the current situation is deemed unsafe if the cross-correlation is weak or if the cross-correlation is strong and its phase shift is large, because in this case a distance between the vehicle and radio key is great, and it is possible for a relay station attack to take place right now, and the vehicle remains locked.

Preferably, the second radio frequency is chosen to be higher than the first radio frequency. Lower frequencies—at least at comparable transmission powers—normally result in a shorter range, which is why the first radio signal has limited range per se, as is desired in certain embodiments, as a result of use of the low frequency, whereas the second radio signal at higher frequency (typically in the UHF band) has a longer range and thus provides a more secure and more powerful transmission link.

The use of these different frequency bands is by no means mandatory for the actual disclosure, however. Fundamentally, the first and second frequencies may also be the same or almost the same (e.g. as part of a bidirectional radio transmission protocol), in which case differently desired ranges can be achieved through different transmission powers, for example.

However, it is also possible to dispense with different ranges entirely if need be, since the inventive concept of comparison of the ambient noise patterns may already allow sufficiently secure verification of whether or not the radio key is in physical proximity to the vehicle.

Further, in a preferred embodiment, an at least one ambient noise signal sequence can be sent to the other device on the second radio frequency.

The disclosure provides information, independent of any attackers, about an actual distance between the vehicle and radio key that cannot be determined using known methods, which is why the system for passive vehicle unlocking equipped therewith is particularly secure.

There follows a description of exemplary embodiments with reference to the drawings, in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
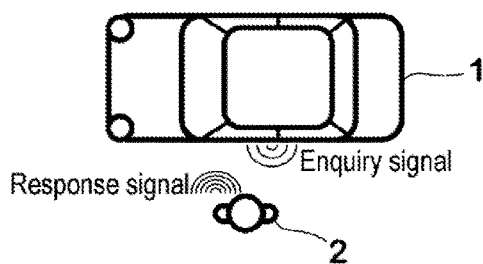
FIG. 1 shows a basic outline of a system for passive vehicle unlocking.
Figure 2:
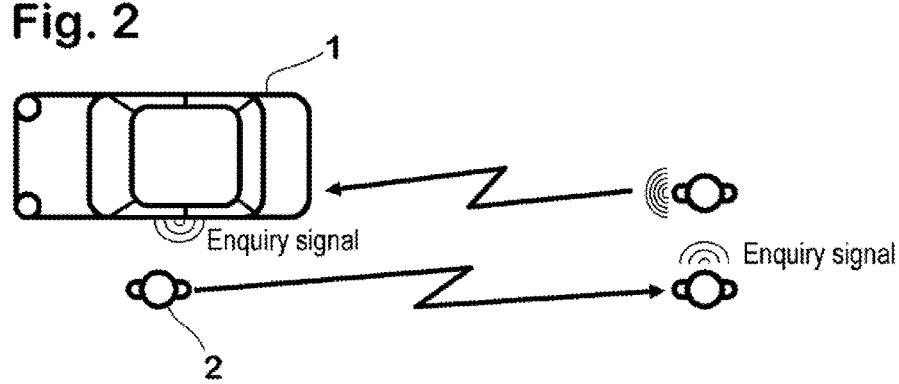
FIG. 2 shows a basic outline of the system from FIG. 1 during a relay station attack.
Figure 3:
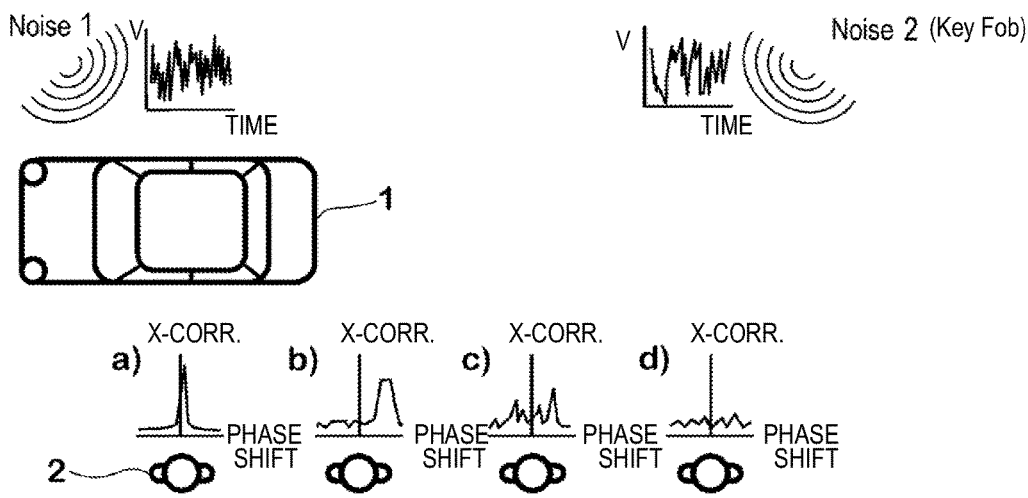
FIG. 3 shows outlines to illustrate the method to secure the system from FIG. 1 against relay station attacks.

In the event of a relay station attack on a system as in FIGS. 1 and 2, there are two options:

One option is for two ambient noise signal sequences to be very different, as depicted as noise 1 and noise 2 in FIG. 3, and for there to be a weak cross-correlation between them.

Alternatively, a radio key 2 and a device 1 installed in the vehicle will both receive a dominant signal, as a result of which the cross-correlation is high. However, there will be a phase shift between them that is substantially larger than can be expected without a relay station attack.

Figure 4:
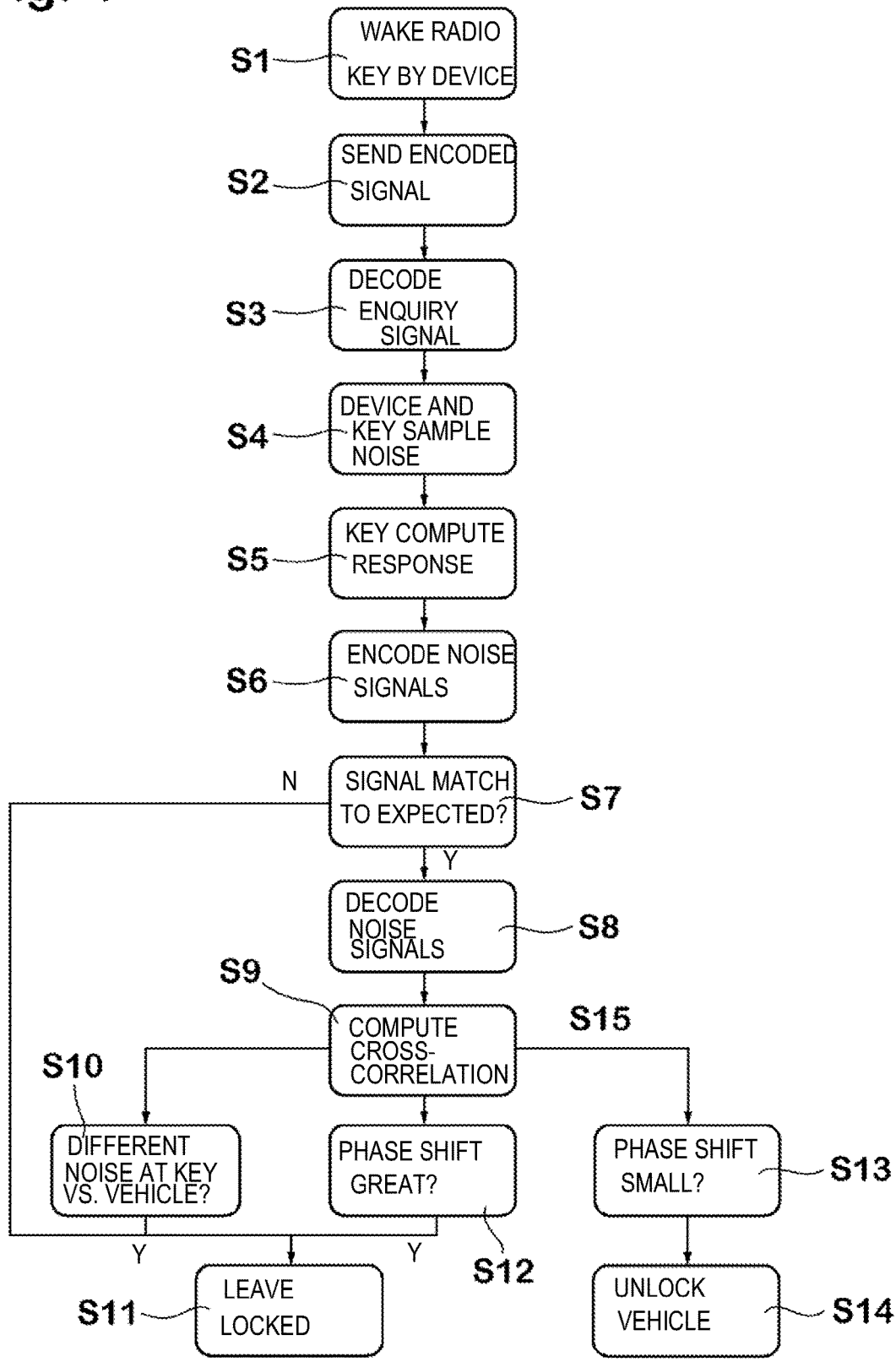
FIG. 4 shows a flowchart for the method to secure the system from FIG. 1 against relay station attacks.

The method to secure a system for passive vehicle unlocking is now described in steps with reference to FIG. 4.

When the user approaches the vehicle, the radio key 2 is woken (S1) by the device installed therein, with the device sending to the radio key 2, a relatively low-frequency radio signal with an encoded enquiry signal (S2) that is decoded (S3) by the radio key 2.

The device 1 installed in the vehicle and the radio key 2 now both sample the noise in their surroundings (S4), each obtaining and recording one or more ambient noise signal sequences. The sampling rate naturally needs to be the same and will, in practice, more likely be the UHF frequency used for keyless entry, but it may also be the lower frequency on which the enquiry signal is sent if both devices have appropriate receivers. Ultimately, it is also possible to use a frequency (a frequency band would also be conceivable) that differs from the prescribed frequencies; this frequency (or this frequency band) merely needs to be samplable by the given hardware on the vehicle and on the radio key 2.

The radio key 2 now computes a response signal (S5) and returns the response signal to the device 1 installed on the vehicle together with one or more sampled ambient noise signal frequencies on the UHF frequency, not only a response signal being encoded but also, expediently, ambient noise signal sequences being encoded (S6 and FIG. 2).

The device 1 installed in the vehicle receives the response signal and the sampled noise, decodes the response signal and checks whether the response signal matches the response signal that is to be expected (S7). If not, it leaves the vehicle locked (S11), and otherwise the device 1 installed in the vehicle also decodes the ambient noise signal sequences (S8) sampled by the radio key 2.

The device 1 installed in the vehicle now compares the ambient noise signal sequences received and the ambient noise signal sequences received by the radio key 2 with cross-correlation (S9) and rates a result thereof, to distinguish between the following three cases:

Weak cross-correlation, as illustrated in graphs c) and d) in FIG. 3, means that the radio key 2 is not in proximity to the device 1 installed in the vehicle and receives a different noise (S10), and the vehicle remains locked (S11).

Strong cross-correlation and large phase shift as in graph b) in FIG. 3 means that the radio key 2 and the device 1 installed in the vehicle receive a dominant signal, but a heavy phase shift shows that a distance between radio key 2 and the device 1 installed in the vehicle is great (S12), and the vehicle remains locked in this case too (S11).

Strong cross-correlation with small phase shift as in graph a) in FIG. 3 means that the radio key 2 and the device 1 installed in the vehicle receive the same signal, with a small phase shift indicating a short distance between radio key 2 and the device 1 installed in the vehicle (S13), and the vehicle is unlocked (S14).

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to secure a system for passive unlocking of a vehicle system against relay station attacks, comprising:
    transmitting signals having first and second radio frequencies between a vehicle-based device configured to send on the first frequency and to receive on the second frequency, and a driver-based device configured to receive on the first frequency and send on the second frequency;
    receiving, via the vehicle-based and driver-based devices, at least one ambient noise signal sequence on the first and second radio frequencies;
    sending the at least one ambient noise signal sequence from either the vehicle-based device to the driver-based device or from the driver-based device to the vehicle-based device
    comparing the ambient noise signal sequences received by the vehicle-based device and the driver-based device via cross-correlation; and
    unlocking the vehicle if the cross-correlation exceeds an associated correlation threshold a phase shift of the ambient noise signal sequences is less than an associated phase shift threshold.

2. The method as claimed in claim 1, further comprising not unlocking the vehicle if the cross-correlation is below the associated correlation threshold, or if the cross-correlation is above the associated correlation threshold and the phase shift is above the associated phase shift threshold.

3. The method as claimed in claim 1, wherein the vehicle-based device receives the at least one ambient noise signal sequence from the driver-based device.

4. The method as claimed in claim 1, wherein the second radio frequency is higher than the first radio frequency and the at least one ambient noise signal sequence is sent to the vehicle-based device on the second radio frequency.

5. An unlocking system apparatus, comprising:
    a vehicle device that includes a transmitter and receiver for first and second radio frequencies, respectively; and
    a driver-based device that includes receivers for the first and second radio frequencies and a transmitter for the second radio frequency,
    wherein the devices each receive ambient noise sequences that are compared to one another using cross-correlation, and provide unlocking when the cross-correlation exceeds a predetermined correlation threshold and a phase shift is less than a predetermined phase shift threshold.

6. The apparatus as claimed in claim 5, wherein the devices do not provide unlocking when the cross-correlation is less than the predetermined correlation threshold, or when cross-correlation exceeds the predetermined correlation threshold and the phase shift exceeds the predetermined phase shift threshold.

7. The apparatus as claimed in claim 5, wherein the vehicle device receives one of the ambient noise sequences from the driver-based device.

8. The apparatus as claimed in claim 5, wherein the second radio frequency is higher than the first radio frequency and the ambient noise sequence is sent on the second radio frequency.

9. A vehicle comprising:
    a device that includes a transmitter and receiver configured to transmit and receive first and second radio frequencies, respectively; and
    a driver device that includes receivers configured to receive the first and second radio frequencies and a transmitter configured to transmit the second radio frequency, wherein the devices each receive an ambient noise sequence that are compared using cross-correlation, and provide unlocking when cross-correlation exceeds an associated correlation threshold and phase shift is less than a corresponding phase shift threshold.

10. The vehicle as claimed in claim 9, wherein the devices do not provide unlocking when cross-correlation is less than the associated correlation threshold, or when cross-correlation exceeds the associated correlation threshold and the phase shift exceeds the corresponding phase shift threshold.

11. The vehicle as claimed in claim 9, wherein the vehicle device receives the ambient noise sequence.

12. The vehicle as claimed in claim 9, wherein the second radio frequency is higher than the first radio frequency and the ambient noise sequence is sent on the second radio frequency.

* * * * *